United States Patent Office 3,826,806
Patented July 30, 1974

3,826,806
FLAME RETARDANT POLYESTERS FROM BROMINATED DIOLS
Lowell R. Comstock, South Charleston, and Percy L. Smith, Dunbar, W. Va., assignors to Union Carbide Corporation, New York, N.Y.
No Drawing. Filed June 6, 1972, Ser. No. 260,200
Int. Cl. C08f 21/02; C08g 17/10, 17/12
U.S. Cl. 260—869                    28 Claims

ABSTRACT OF THE DISCLOSURE

This invention relates to brominated, unsaturated polyesters, based on a brominated diol and an unsaturated polycarboxylic acid or anhydride thereof, which are substantially free of dibrominated diol moieties, contain bromine end groups and possess excellent flame-retardant properties, excellent thermal stability and can be used in molding applications to form aesthetically attractive articles characterized by excellent chemical, physical and electrical properties.

---

This invention relates to flame-retardant, unsaturated polyesters, a process for the preparation thereof and to thermosetting compositions based thereon. More particularly, this invention relates to brominated, unsaturated polyesters, based on a brominated diol and an unsaturated polycarboxylic acid or anhydride thereof coreactant, which are substantially free of dibrominated glycol moieties, contain bromine end groups and possess excellent flame-retardant properties, excellent thermal stability and can be used in molding applications to form aesthetically attractive thermoset articles, characterized by excellent physical, chemical and electrical properties, which are useful as structural elements such as fenders, dashboards and other like component parts of automobiles.

The brominated polyesters of this invention have: an acid number less than about 100, generally about 10 to about 60 and preferably about 25 to about 50; contain at least about 2 percent by weight combined bromine, generally about 2 to about 40 percent by weight combined bromine and preferably about 10 to about 25 percent by weight combined bromine based on the weight of the polyester; have bromine end groups; are substantially free of dibrominated diol moieties; and are the condensation reaction products of a mixture containing a brominated diol and an unsaturated, polycarboxylic acid or anhydride thereof.

It is to be understood that mixtures of reactants noted in this specification can be used if so desired.

Brominated diols which are suitable for purposes of this invention are those polybrominated diols which liberate hydrogen bromide at temperatures on the order of about 75° C. to about 200° C.

Among specific compounds which can be brominated to produce the polybrominated diols suitable for purposes of this invention are the following:

(1)        HOCH$_2$CH=CHCH$_2$OH
           1,4-dihydroxybutene-2

(2)        HOCH$_2$—CH=CH—CH$_2$CH$_2$OH
           1,5-dihydroxypentene-2

(3)        CH$_2$=CHCH$_2$CH—CH—CH$_3$
                          |    |
                          OH   OH
           4,5-dihydroxyhexene-1

(4)        CH$_3$CHCH$_2$—OCH$_2$CH=CHCH$_2$—CH$_2$—CH=CHCH$_3$
           |  |
           OH OH
           2,3-dihydroxypropyl-2,6-octadienylether (5) 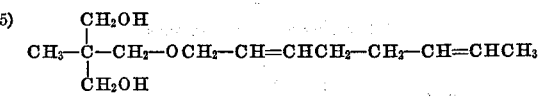
2,2-dimethylolpropyl-2,6-octadienylether (6) 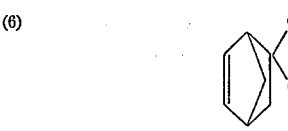
2,2-dimethylolbicycloheptene-5

(7) 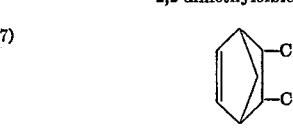
2,3-dimethylolbicycloheptene-5

(8) 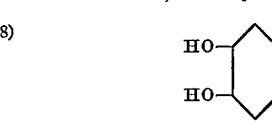
1-vinyl-4,5-dihydroxycyclohexane (9) 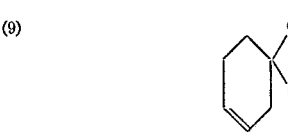
1,1-dimethylolcyclohexene-3

(10) 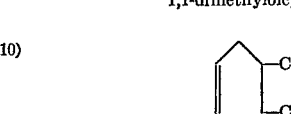
1,2-dimethylol-cyclohexene-4

(11) 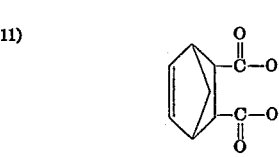
bis(β-hydroxyethyl)-5-bicycloheptene-2,3-dicarboxylate

(12) 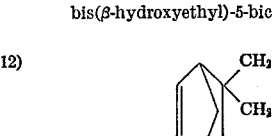
2,2-bis(β-hydroxyethoxymethyl)bicycloheptene-5

The brominated diols can be prepared by reacting a mixture containing about equivalent amounts of bromine with the desired diol. This reaction is conducted at temperatures on the order of about 20° C. to about 150° C.

Brominating compounds of (1)–(12) above will yield the following brominated diols:

(1) 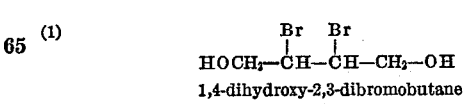
1,4-dihydroxy-2,3-dibromobutane (2) 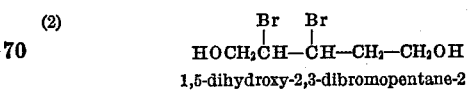
1,5-dihydroxy-2,3-dibromopentane-2

(3)
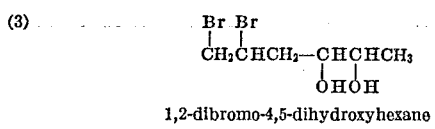
1,2-dibromo-4,5-dihydroxyhexane (4)
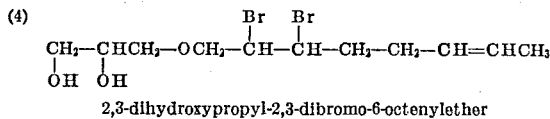
2,3-dihydroxypropyl-2,3-dibromo-6-octenylether Also suitable are the tri and tetrabromo derivatives of compound (4).

(5)
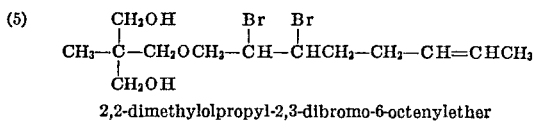
2,2-dimethylolpropyl-2,3-dibromo-6-octenylether

Also suitable are the tri and tetrabromo derivatives of compound (5).

(6)
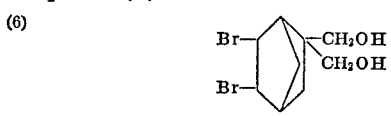
2,2-dimethylol-5,6-dibromobicycloheptane (7)
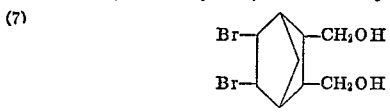
2,3-dimethylol-5,6-dibromobicycloheptane (8)
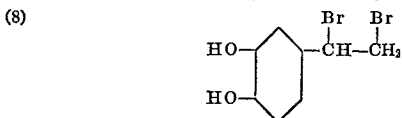
1-(2-β-dibromoethyl)-4,5-dihydroxycyclohexane (9)
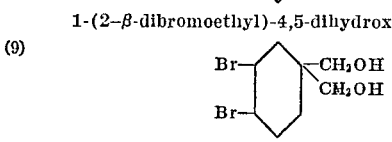
1,1-dimethylol-4,5-dibromocyclohexane

(10)
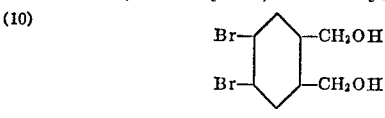
1,2-dimethylol-4,5-dibromocyclohexane

(11)
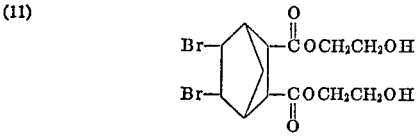
bis(β-hydroxyethyl)-5,6-dibromobicycloheptane-2,3-dicarboxylate

(12)
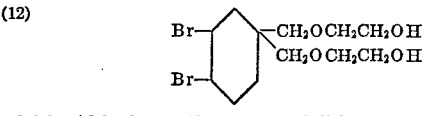
2,2-bis(β-hydroxyethoxymethyl)-5,6-dibromobicycloheptane

Among suitable unsaturated polycarboxylic acids which can be used to produce the polyesters of this invention are those having the formula:

FORMULA I

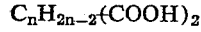

wherein $n$ is an integer having a value of 2 to 20 inclusive, preferably 2 to 10 inclusive. Among such acids can be noted, fumaric acid, maleic acid, glutaconic acid, citraconic acid, itaconic acid, ethidenemalonic acid, mesaconic acid, allylmalonic acid, propylidenemalonic acid, hydromuconic acid, pyrocinchonic acid, allyl succinic acid, carbocaprolatonic acid, teraconic acid, xeronic acids, cetyl-malonic acid and other like ethylenically unsaturated acids.

Other suitable unsaturated acids include 4-amyl-2,5-heptadienedioic acid, 3-hexynedioic acid, tetrahydrophthalic acid, 3-carboxy cinnamic acid and the like.

If desired, the acid anhydrides of the acids previously described in the two preceding paragraphs can be used per se or in admixture with the acids.

Also, if desired, aromatic polycarboxylic acids, saturated polycarboxylic acids, anhydrides thereof or monocarboxylic acids can be used, in conjunction with the unsaturated polycarboxylic acids or the anhydrides thereof and the brominated materials, to produce the polyesters of this invention.

Illustrative of saturated polycarboxylic or aromatic polycarboxylic acids include, among others, phthalic acid, hexahydrophthalic acid, tetrachlorophthalic acid, succinic acid, adipic acid, suberic acid, azelaic acid, sebacic acid, and the like.

If desired, non-halogenated diols can be used in producing the unsaturated polyesters of this invention. Illustrative of suitable non-halogenated diols are the diols previously described as well as diols having the formula:

FORMULA II

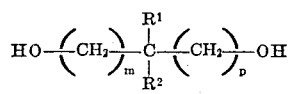

wherein the sum of $m+p$ is at least 1, generally 1 to 20 inclusive, preferably 4 to 10 inclusive and $R^1$ and $R^2$, which can be the same or different, are hydrogen or alkyl and when alkyl, containing 1 to 20 carbon atoms inclusive, preferably 1 to 10 carbon atoms inclusive. Specific compounds include, among others, ethylene glycol, propylene glycol, butanediol-1,2, butanediol-1,3, butanediol-1,4, hexanediol-1,6, decanediol-1,10, neopentyl glycol and the like.

Also suitable are the ether diols having the formula:

FORMULA III

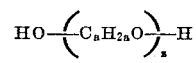

wherein $a$ has a value of at least 1, preferably 2 to 6 inclusive, and $z$ has a value of at least 2, preferably 2 to 10 inclusive. Among compounds falling within the scope of this formula are diethylene glycol, dipropylene glycol, triethylene glycol, tetraethylene glycol, and the like.

Other suitable non-halogenated diols are the polyalkylene glycols such as polyethylene glycol and polypropylene glycol, having molecular weights ranging from about 1,100 to about 20,000.

The condensation reaction between the brominated diols and the "acidic" coreactant to produce the unsaturated polyesters of this invention is carried out at elevated temperatures on the order of about 165° C. to about 225° C. and preferably about 170° C. to about 200° C. for a period of time sufficient to produce an unsaturated polyester, as previously described.

In conducting the condensation reaction the total amount of "diol" used (i.e., brominated as well as non-halogenated diol) is at least about a stoichiometric amount, generally at least about one percent in excess of the stoichiometric amount and preferably about one percent to about 10 percent in excess of the stoichiometric amount, with the amount of brominated diol being sufficient to produce a polyester having the bromine content described.

For purposes of stoichiometric calculations, amounts of "diol" as described are based on the total amount of "acidic reactants" in the reaction mixture. The "acidic reactants" include the unsaturated polycarboxylic acids, anhydrides thereof as well as other acids and anhydrides thereof which can be used if desired, in producing the polyesters of this invention. "Acidic reactants" also includes hydrogen bromide which is split off during the condensation reaction. For purposes of stoichiometric calculations, one molecule of hydrogen bromide is deemed to split-off, from each molecule of brominated diol used, for each dibromo group having bromine atoms attached to vicinal carbon atoms.

For purposes of illustration the bromination of a diol and subsequent condensation thereof to produce a brominated, unsaturated polyester can be ideally represented as shown below wherein the reactants are bicycloheptene dimethanol, ethylene glycol and maleic acid anhydride.

Reaction No. 1.—Bromination

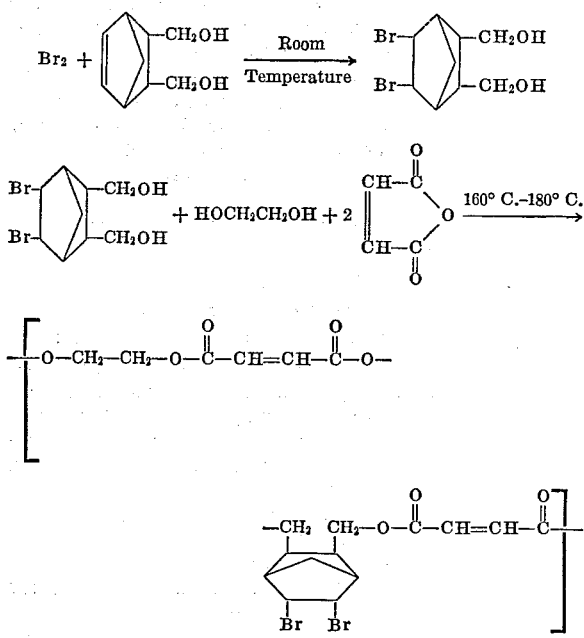

brominated polyester containing dibrominated glycol moieties

Reaction No. 3.—Dehydrobromination

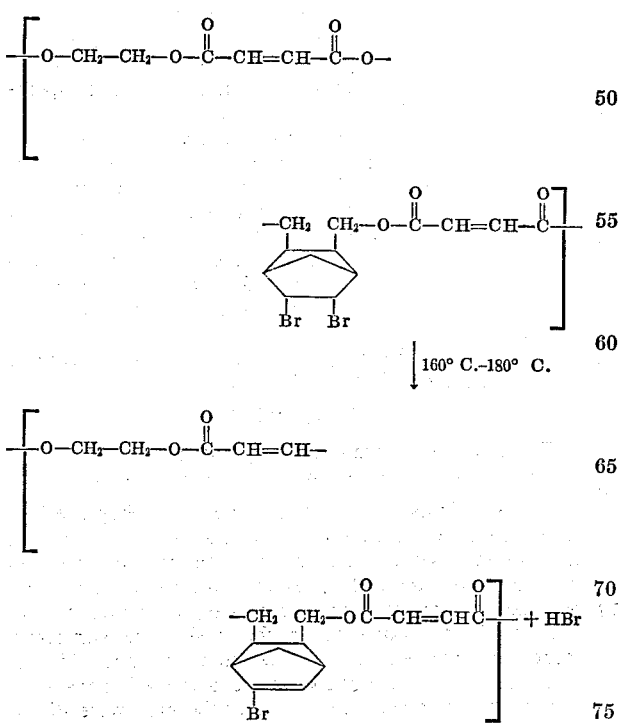

Reaction No. 4. 4.—Reaction between polyester and HBr

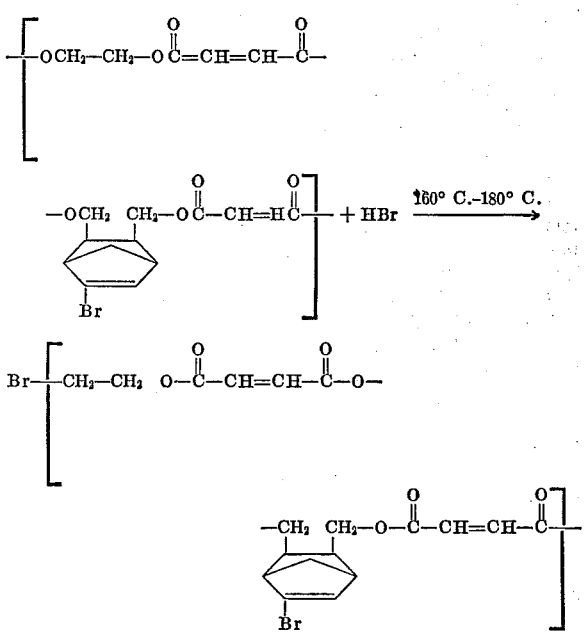

Polyester-bromine terminated and free of dibrominate glycol moieties

Reaction No. 5.—Reaction between free glycol and unreacted HBr

(bromohydrin removed as overhead)

These reactions are believed to be the primary reactions, in idealized form, although not the entire reactions involving the brominated materials to produce the polyesters of this invention.

As stated, the unsaturated polyesters of this invention can be formulated into molding compositions and formed into thermoset products useful in the automotive industry, boat industry and the like.

In formulating such compositions which are to be used in molding applications, it is customary to admix, with the unsaturated polyesters, the following materials:

(1) A polymerizable ethylenicaly unsaturated monomer which serves to cross-link the unsaturated polyester to a thermoset product.

(2) A peroxide which serves to accelerate the cross-linking reaction.

(3) Fillers, including fillers which serve as reinforcing agents.

Illustrative of suitable polymerizable, ethylenically unsaturated monomers are the vinyl monomers having the formula:

FORMULA IV $$CH_2=\overset{R'}{\underset{}{C}}-R$$

wherein R' is hydrogen, halogen or alkyl, i.e., methyl, R is a group having an unsaturated carbon-to-carbon, carbon-to-oxygen, or carbon-to-nitrogen group in conjugation with the vinyl group. Groups having such unsaturation in conjugation with the vinyl group are aryl, ketonic, heterocyclic, nitrile, carbalkoxy, carboxy and amido.

Specific vinyl monomers include the following:

Wherein R is aryl; styrene; halogenated styrenes such as chlorostyrene, α-chlorostyrene, p-iodostyrene, m-fluorostyrene, dichlorostyrene; α-methylstyrene and the like; alkyl substituted styrenes such as p-methylstyrene, p-ethylstyrene, o-tert-butylstyrene and the like; alkoxy and aryloxy substituted styrenes such as p-ethoxystyrene, p-propoxystyrene, p-phenoxystyrene and the like;

Wherein R is ketonic; ethyl vinyl ketone, n-propylvinyl ketone, phenyl vinyl ketone and the like;

Wherein R is heterocyclic; vinyl pyridine, vinyl quinoline, vinyl pyrrole, vinyl carbazole, vinyl thiophene and the like;

Wherein R is nitrile, acrylonitrile and the like;

Wherein R is amido; achrylamide, bicycloheptylacrylamide, diacetoneacrylamide and the like;

Wherein R is carboxy; acrylic acid and the like;

Wherein R is carbalkoxy; methyl acrylate, methyl methacrylate, butyl acrylate, octyl acrylate, lauryl acrylate, cyclohexyl acrylate, phenyl acrylate, benzyl acrylate and the like.

Also suitable is diallylphthalate and the like.

The amount of ethylenically unsaturated monomer used can vary over wide limits. For example, the monomer can be used in amounts of about 10 to about 60 percent by weight based on the combined weight of the monomer and the polyester. It is preferred to use about 20 to about 50 percent by weight ethylenically unsaturated monomer, based on the combined weight of the monomer and polyester.

Among suitable peroxides that can be used are those which function as free-radical polymerization initiators. Examples of such peroxides are the hydroperoxides such as *tert*-butyl hydroperoxide, cumene hydroperoxide, *para*-methane hydroperoxide and the like; peroxy esters such as di-*tert*-butyl diperoxyphthalate, *tert*-butyl peroxyacetate and the like; alkyl peroxides such as di-*tert*-butyl peroxide, dibenzyl peroxide and the like; ketone peroxides such as methyl ethyl ketone peroxide, cyclohexanone peroxide and the like; acyl peroxides such as benzoyl peroxide, *para*-chlorobenzoyl peroxide, 2,4-dichlorobenzoyl peroxide, lauroyl peroxide and the like.

The amount of peroxide used is sufficient to effect a cross-linking or thermosetting of the composition in a relatively short period of time. As a rule the amount used is about 0.1 to about 5 percent and preferably about 0.5 to about 2 percent by weight based on the weight of the polyester.

Fillers which are commonly employed in polyester compositions include, among others, glass fibers, clay, calcium carbonate, silica, hydrated alumina antimony oxide, and the like. These materials are generally used in amounts of about 2 to about 80 percent by weight based on the weight of the polyester resin.

In addition, if desired, phosphorus containing compounds such as *tri*(2-chloroethyl)phosphate can be added to the compositions of this invention.

The compositions of this invention can be prepared by mixing the components in a suitable apparatus such as a Cowles dissolver, at temperatures on the order of about 25° C. to about 50° C.

Once formulated, the compositions can be formed into thermoset articles of desired shape, particularly thermoset articles such as automobile fenders, dashboards, building panels, boats and the like. The actual forming cycle used such as hand lay-up, spray-up and molding using matched metal molds, will vary and depend upon the composition being used and the ultimate article formed. Suitable molding cycles are conducted at temperatures on the order of 25° F. to about 250° F. for periods of time ranging from about 0.5 minute to about 5 minutes.

The following examples further illustrate the present invention.

EXAMPLE 1

This example illustrates the preparation of a polyester based on a prebrominated 1,4-dihydroxybutene-2

(a) Bromination of 1,4-dihydroxy butene-2.—Into a reaction flask equipped with a mechanical stirrer, thermometer, condenser, dropping funnel and gas-inlet tube, there was charged one mole of 1,4-dihydroxy butene-2 and 2.5 moles of ethylene glycol. Bromine, in an amount of 0.95 mole, was then added dropwise into the reaction flask while the contents of the flask were constantly stirred, maintained at a temperature of 25° C. and kept under a nitrogen gas atmosphere. After the addition of the bromine, the contents of the flask were stirred for one hour at room temperature. At the end of the one hour period, the bromine color (dark red) disappeared therefrom indicating completion of the bromination reaction.

(b) Preparation of the brominated polyester.—Into the flask containing the brominated glycol (a) above, there was charged 2 moles of maleic acid anhydride and 1 mole of phthalic acid anhydride. The mixture was heated to a temperature of 180° C. and maintained at this temperature for 6 hours. The resultant polyester had an acid number of 50, was characterized by bromine end groups and was substantially free of dibrominated glycol moieties, as determined by nuclear magnetic resonance.

The polyester was cooled to a temperature of 150° C. and hydroquinone, a stabilizer, was added thereto in an amount of 0.02 percent by weight based on the weight of the polyester. Styrene was then admixed with the polyester to provide a styrene solution containing 30 percent by weight styrene.

Properties of the polyester and the polyester-styrene composition are set forth in Table 1.

EXAMPLE 2

This example illustrates the preparation of a polyester based on a prebrominated 1,1-dimethanolcyclohexene-3

(a) Bromination of 1,1 - dimethanolcyclohexene-3.— Into a reaction flask equipped with a mechanical stirrer, thermometer, condenser, dropping funnel and gas-inlet tube, there was charged 2 moles of 1,1-dimethanolcyclohexene-3 and 600 grams of benzene. Bromine, in an amount of 0.95 mole, was then added dropwise into the reaction flask while the contents of the flask were constantly stirred, maintained at a temperature of 25° C. and kept under a nitrogen gas atmosphere. After the addition of the bromine, the contents of the flask were stirred for one hour at room temperature. At the end of the one hour period, the bromine color (dark red) disappeared therefrom indicating completion of the bromination reaction. Benzene was then removed from the reacted mixture by heating the mixture at a temperature of 70° C. while under a pressure of 1.5 mm. Hg.

(b) Preparation of the brominated polyester.—Into the flask containing the brominated glycol (a) above, there was charged 4 moles of maleic acid anhydride and 2.6 moles of ethylene glycol. The mixture was heated to a temperature of 180° C. and maintained at this temperature for 6 hours. The resultant unsaturated polyester had an acid number of 40, was characterized by bromine end groups and was substantially free of dibrominated glycol moieties as determined by nuclear magnetic resonance.

The polyester was cooled to a temperature of 150° C. and hydroquinone, was added thereto in an amount of 0.02 percent by weight based on the weight of the polyester. Styrene was then admixed with the polyester to provide a styrene solution containing 30 percent by weight styrene.

Properties of the polyester and the polyester-styrene composition are set forth in Table 1.

EXAMPLE 3

This example illustrates the preparation of a polyester based on a prebrominated bicycloheptene dimethanol.

(a) Bromination of 2,3-dimethanol bicycloheptene-5.— Into a reaction flask equipped with a mechanical stirrer, thermometer, condenser, dropping funnel and gas-inlet tube, and containing 2 moles of 2,3-dimethanol bicycloheptene-5, there was added, dropwise, 1.4 moles of bromine while the contents of the flask were constantly stirred, maintained at a temperature of about 15° C. and kept under a nitrogen gas atmosphere. After the addition of the bromine, the contents of the flask were stirred for one hour at room temperature. At the end of the one hour period, the bromine color (dark red) disappeared therefrom, indicating completion of the bromination reaction.

(b) Preparation of the brominated polyester.—Into the flask containing the brominated glycol (a) above, there was charged 4 moles of maleic acid anhydride and 2.8 moles of ethylene glycol. The mixture was heated to a temperature of 180° C. and maintained at this temperature for 5 hours. The resultant polyester had an acid number of 45, was characterized by bromine end groups and was substantially free of dibrominated glycol moieties as determined by nuclear magnetic resonance.

The polyester was cooled to a temperature of 150° C. and hydroquinone was added thereto in an amount of 0.02 percent by weight based on the weight of the polyester. Styrene was then admixed with the polyester to provide a styrene solution containing 30 percent by weight styrene.

Properties of the polyester and the polyester-styrene composition are set forth in Table 1.

EXAMPLE 4

This example illustrates the preparation of a polyester based on a prebrominated octadienyl ether.

(a) Bromination of 2,2-dimethanolpropyl-2,6-octadienyl ether.—Into a reaction flask equipped with a mechanical stirrer, thermometer, condenser, dropping funnel and gas-inlet tube, there was charged 0.163 mole of the octadienyl ether and 200 grams of benzene. Bromine, in an amount of 0.27 mole, was then added dropwise into the reaction flask while the contents of the flask were constantly stirred, maintained at a temperature of 25° C. and kept under a nitrogen gas atmosphere. After the addition of the bromine, the contents of the flask were stirred for one hour at room temperature. At the end of the one hour period the bromine color (dark red) disappeared therefrom indicating completion of the bromination reaction.

(b) Preparation of the brominated polyester.—Into the flask containing the brominated glycol (a) above, there was charged 1.08 moles of maleic acid anhydride and 0.54 mole of phthalic anhydride and 1.65 mole of ethylene glycol. The mixture was heated to a temperature of 175° C. and maintained at this temperature for 5 hours. The resultant polyester had an acid number of 58, was characterized by bromine end groups and was substantially free of dibrominated glycol moieties as determined by nuclear magnetic resonance.

The polyester was cooled to a temperature of 150° C. and hydroquinone, a stabilizer, was added thereto in an amount of 0.02 percent by weight based on the weight of the polyester. Styrene was then admixed with the polyester to provide a styrene solution containing 30 percent by weight styrene.

Properties of the polyester and the polyester-styrene composition are set forth in Table 1.

In order to demonstrate the excellent properties of the polyesters of this invention, properties of polyesters of Examples 1–4 were compared to the properties of polyesters referred to as the Controls prepared by a process in which the polyester was prepared first and then brominated.

Control 1 was prepared as follows and was based on 1,4-dihydroxy butene-2.

Into a reaction flask equipped with a mechanical stirrer, thermometer, condenser, dropping funnel and gas-inlet tube, there was charged 2 moles of maleic acid anhydride, one mole of phthalic acid anhydride, 2.2 moles of ethylene glycol and 1 mole of 1,4-dihydroxy butene-2. The mixture was heated at a temperature of 200° C. to an acid number of 50. The resultant polyester was cooled to a temperature of about 100° C. and maintained at about 100° C. while bromine, in an amount of 0.95 mole, was added dropwise into the flask while the contents of the flask were constantly stirred and maintained under a nitrogen gas atmosphere. After the addition of the bromine, the contents of the flask were heated for one hour at a temperature of about 100° C. At the end of the one hour period, the bromine color disappeared therefrom indicating completion of the bromination reaction. To the "post" brominated polyester, which had an acid number of 70 and was characterized by the substantially presence of dibrominated glycol moieties, as determined by nuclear magnetic resonance, there was then added 0.01 percent by weight hydroquinone, based on the weight of the polyester. Styrene was then admixed with the polyester to obtain a styrene solution containing 30 percent by weight styrene.

Control 2 was prepared as follows and was based on 2,3-dimethanol bicycloheptene-5.

In to a reaction flask equipped with a mechanical stirrer, thermometer, condenser, dropping funnel and gas-inlet tube, there was charged 4 moles of maleic acid anhydride, 2 moles of 2,3-dimethanol bicycloheptene-5, and 2.4 moles of ethylene glycol. The mixture was heated at a temperature of 200° C. to an acid number of 36. The resultant polyester was cooled to a temperature of about 100° C. and maintained at about 100° C. while bromine, in an amount of 1.4 moles was added dropwise into the flask while the contents of the flask were constantly stirred and maintained under a nitrogen gas atmosphere. After the addition of the bromine, the contents of the flask were heated for one hour at a temperature of about 100° C. At the end of the one hour period, the temperature of the reaction mixture dropped to about 50° C. and the bromine color disappeared therefrom indicating completion of the bromination reaction. To the "post" brominated polyester, which had an acid number of 55 and was characterized by the substantial presence of dibrominated glycol moieties as determined by nuclear magnetic resonance, there was then added 0.01 percent by weight hydroquinone, based on the weight of the polyester. Styrene was then admixed with the polyester to obtain a styrene solution containing 30 percent by weight styrene.

Control 3 was prepared as follows and was based on octadienyl ether.

Into a reaction flask equipped with a mechanical stirrer, thermometer, condenser, dropping funnel and gas-inlet tube, there was charged 1.08 moles of maleic acid anhydride, 0.54 mole of phthalic acid anhydride, 1.63 moles of ethylene glycol and 0.163 mole of 2,2-dimethanol propyl-2,6-octadienyl ether. The mixture was heated at a temperature of 200° C. to an acid number of 24. The resultant polyester was cooled to a temperature of about 100° C. and maintained at about 100° C. while bromine, in an amount of 0.95 mole, was added dropwise into the flask while the contents of the flask were constantly stirred and maintained under a nitrogen gas atmosphere. After the addition of the bromine, the contents of the flask were heated for one hour at a temperature of about 100° C. At the end of the one hour period, the bromine color disappeared therefrom indicating completion of the bromination reaction. To the "post" brominated polyester, which had an acid number of 50 and was characterized by the substantial presence of dibrominated glycol moieties as determined by nuclear magnetic resonance, there was then added 0.01 percent by weight hydroquinone, based on the weight of the polyester. Styrene was then admixed with the polyester to obtain a styrene solution containing 30 percent by weight styrene.

Viscosity determinations noted in Table 1 were made at 25° C. using a Brookfield viscometer which was operated at 30 r.p.m. with a No. 3 spindle.

Compositions noted as being cured in Table 1 were cured or thermoset by adding thereto 1.0 percent by weight benzoyl peroxide, based on the total weight of the compositions, casting the compositions into plaques 5 inches by 12 inches by ¼ of an inch and subjecting the plaques to the following heating cycle:

2 hours at a temperature of 60° C.
3 hours at a temperature of 125° C.

Tensile strength and flexural strength determinations noted in Table 1 were carried out according to the procedure described in ASTM test 638-64T.

Gel time determinations, including gel time, exotherm temperature and peak time, noted in Table 1 were carried out according to the standard tests of the Society Plastics Industry.

TABLE 1

| | Controls | | | Examples | | | |
|---|---|---|---|---|---|---|---|
| | 1 | 2 | 3 | 1 | 2 | 3 | 4 |
| Properties of polyester: | | | | | | | |
| Percent by weight combined bromine | 22 | 22 | 13.5 | 20 | 20 | 20 | 13 |
| Acid number | 50 | 36 | 24 | 50 | 40 | 45 | 58 |
| Acid number after post bromination of polyester | 70 | 55 | 50 | | | | |
| Properties of styrene-polyester composition: | | | | | | | |
| Percent by weight combined bromine | 16 | 16 | 9.5 | 14 | 14 | 14 | 9 |
| Acid number | 52 | 37 | 35 | 35 | 28 | 35 | 37 |
| Viscosity, centipoises | 1,000 | 2,880 | 2,500 | 200 | 450 | 238 | 750 |
| Gel time, min./sec | 17/45 | 12/20 | 15/25 | 4/12 | 3/47 | | 3/50 |
| Exotherm temp., ° C | | 114 | | 204 | 241 | | 235 |
| Peak time, min./sec | | 18/00 | | 6/12 | 5/40 | | 4/57 |
| Color, Gardner scale | 14 | 7 | 9 | 12 | 2 | 6 | 9 |
| Properties of cured styrene-polyester composition: | | | | | | | |
| Color, Gardner scale | >14 | 10 | 12 | 12 | 3 | 6 | 10 |
| Heat distortion temp., ° C | 25 | 40 | 25 | 65 | 146 | 112 | 82 |
| Tensile strength, p.s.i | 2,500 | 3,500 | 1,760 | 7,700 | 7,500 | 6,700 | 5,650 |
| Flexural strength, p.s.i | | | 3,295 | 14,890 | 13,000 | 14,000 | 13,160 |
| Flammability, ASTMD-635-56T | *SE | *SE | *SE | *SE | *SE | *SE | *SE |

*SE=Self extinguishing.

The following is a list of the brominated diols of Examples 1-4 of this specification:

Example 1.—1,4-dihydroxy-2,3-dibromobutane.
Example 2.—1,1-dimethanol-3,4-dibromocyclohexane.
Example 3.—2,3-dimethanol-5,6-dibromobicycloheptane.
Example 4.—2,2-dimethanol-2,3-dibromo-6-octenyl ether.

The term "substantially free of dibrominated glycol moieties" as used herein means substantially free of dibrominated glycol moieties wherein the bromine atoms are attached to vicinal carbon atoms.

Also, in testing the brominated diols to determine the "hydrogen bromide" split-off, the brominated diol is heated at temperatures on the order of about 75° C. to about 200° C., and the amount of hydrogen bromide split-off measured by collecting, in water, the gas which is evolved and titrating the water-gas mixture with sodium hydroxide (0.01 N) to a phenolphthalein end point.

What is claimed is:

1. Process of preparing a brominated polyester which comprises condensing, at a temperature of about 165° C. to about 225° C., a reaction mixture containing (A) a polybrominated diol which liberates hydrogen bromide at a temperature of about 75° C. to about 200° C., and (B) at least one unsaturated polycarboxylic acid selected from the group consisting of fumaric acid, maleic acid, glutaconic acid, citraconic acd, itaconic acid, ethidene malonic acid, mesaconic acid, propylidenemalonic acid, hydromuconic acid, pyrocinchonic acid, 3 carboxy cinnamic acid, teraconic acid, and the acid anhydrides thereof, or (C) a mixture of tetrahydrophthalic acid or its anhydrides with at least one of said unsaturated polycarboxylic acids or anhydrides, to an unsaturated polyester having an acid number less than about 100, having bromine end groups, containing at least about 2 percent by weight combined bromine and being substantially free of dibrominated glycol moieties in which bromine atoms are attached to vicinal carbon atoms.

2. Process as defined in claim 1 wherein the reaction mixture contains at least about a stoichiometric amount of a polybrominated diol and a non-halogenated diol.

3. Process as defined in claim 2 wherein the non-halogenated diol has the formula:

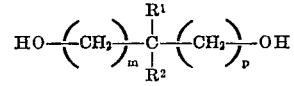

wherein the sum of $m+p$ is at least 1, $R^1$ and $R^2$ are hydrogen or alkyl containing 1 to 20 carbon atoms inclusive.

4. Process as defined in claim 2 wherein the non-halogenated diol has the formula:

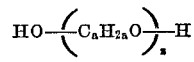

wherein $a$ has a value of at least 1 and $z$ has a value of at least 2.

5. Process as defined in claim 1 wherein the condensation reaction is conducted at temperatures of about 165° C. to about 225° C.

6. Process as defined in claim 1 wherein maleic acid anhydride is present in the reaction mixture.

7. Process as defined in claim 1 wherein phthalic acid anhydride is present in the reaction mixture.

8. Process as defined in claim 2 wherein the nonbrominated diol is ethylene glycol.

9. Process as defined in claim 1 wherein 1,4-dihydroxy-2,3-dibromobutane is present in the reaction mixture.

10. Process as defined in claim 1 wherein 1,1-dimethylol-3,4-dibromocyclohexane is present in the reaction mixture.

11. Process as defined in claim 1 wherein 2,3-dimethylol-5,6-dibromobicycloheptane is present in the reaction mixture.

12. Process as defined in claim 1 wherein 2,2-dimethylolpropyl-2,3-dibromo-6-octenylether is present in the reaction mixture.

13. A brominated, unsaturated polyester having an acid number less than about 100, having bromine end groups, containing at least about 2 percent by weight combined bromine and being substantially free of dibrominated glycol moieties in which bromine atoms are attached to vicinal carbon atoms, said polyester being the condensation reaction product of a mixture as defined in claim 1.

14. A brominated polyester as defined in claim 13 containing about 2 to about 40 percent by weight combined bromine.

15. A brominated polyester as defined in claim 13 wherein the mixture contains at least about a stoichiometric amount of a polybrominated diol and a non-halogenated diol.

16. A brominated polyester as defined in claim 15 wherein the mixture contains about one percent to about 10 percent in excess of the stoichiometric amount of a polybrominated diol and a non-halogenated diol.

17. A brominated polyester as defined in claim 15 wherein the non-halogenated diol has the formula:

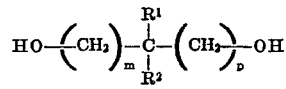

wherein the sum of $m+p$ is 4 to 10 inclusive and $R^1$ and $R^2$ are hydrogen or alkyl containing 1 to 10 carbon atoms inclusive.

18. A brominated polyester as defined in claim 15 wherein ethylene glycol is present as a non-halogenated diol.

19. A brominated polyester as defined in claim 13 wherein there is present in the reaction mixture phthalic acid or anhydride thereof.

20. A brominated polyester as defined in claim 13 wherein there is present in the reaction mixture maleic acid or anhydride thereof.

21. A brominated polyester as defined in claim 15 wherein the non-halogenated diol has the formula:

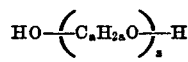

where $a$ has a value of at least one and $z$ has a value of at least 2.

22. A brominated polyester as defined in claim 13 wherein 1,4-dihydroxy-2,3-dibromobutane is present in the reaction mixture.

23. A brominated polyester as defined in claim 13 wherein 1,1-dimethylol-3,4-dibromocyclohexane is present in the reaction mixture.

24. A brominated polyester as defined in claim 13 wherein 2,3-dimethylol - 5,6 - dibromobicycloheptane is present in the reaction mixture.

25. A brominated polyester as defined in claim 13 wherein 2,2-dimethylolpropyl-2,3-dibromo-6-octenylether is present in the reaction mixture.

26. A thermosetting composition comprising the polyester as defined in claim 13 and an ethylenically unsaturated monomer in an amount of about 10 to about 60 percent by weight.

27. A thermosetting composition as defined in claim 26 wherein the ethylenically unsaturated monomer is styrene.

28. A thermosetting composition as defined in claim 26 containing a peroxide.

References Cited

UNITED STATES PATENTS 3,536,782 10/1970 Toggweiler et al. ____ 260—869
3,697,625 10/1972 Smith et al. _____ 260—869

OTHER REFERENCES

Bjorksten: Polyesters, Reinhold, New York, 1956, pp. 21–24.

Lawrence: Polyester Resins, Reinhold, New York, 1960, pp. 20 and 22.

Boenig: Unsaturated Polyesters, Elsevier, New York, p. 100.

Kirk-Othmer, Encyl. Chem. Technol., vol. 20, Interscience, New York, pp. 791 and 802.

MELVIN GOLDSTEIN, Primary Examiner

U.S. Cl. X.R.
260—75 H, Dig. 24